(12) United States Patent
Schweizer et al.

(10) Patent No.: US 10,021,896 B2
(45) Date of Patent: Jul. 17, 2018

(54) PRODUCTION OF PULSE PROTEIN PRODUCT WITH REDUCED ASTRINGENCY

(71) Applicants: Martin Schweizer, Winnipeg (CA); Sarah Medina, Winnipeg (CA); Kevin I. Segall, Winnipeg (CA)

(72) Inventors: Martin Schweizer, Winnipeg (CA); Sarah Medina, Winnipeg (CA); Kevin I. Segall, Winnipeg (CA)

(73) Assignee: BURCON NUTRASCIENCE (MB) CORP., Winnipeg, Manitoba (CA)

( * ) Notice: Subject to any disclaimer, the term of this patent is extended or adjusted under 35 U.S.C. 154(b) by 0 days.

(21) Appl. No.: 15/435,806

(22) Filed: Feb. 17, 2017

(65) Prior Publication Data
US 2017/0156367 A1    Jun. 8, 2017

Related U.S. Application Data

(63) Continuation of application No. 14/290,415, filed on May 29, 2014.

(51) Int. Cl.
| | |
|---|---|
| A23J 3/14 | (2006.01) |
| A23L 2/66 | (2006.01) |
| A23L 2/39 | (2006.01) |
| A23J 1/14 | (2006.01) |
| A23L 11/30 | (2016.01) |

(52) U.S. Cl.
CPC .............. *A23J 3/14* (2013.01); *A23J 1/142* (2013.01); *A23L 2/39* (2013.01); *A23L 2/66* (2013.01); *A23L 11/32* (2016.08); *A23V 2002/00* (2013.01)

(58) Field of Classification Search
None
See application file for complete search history.

(56) References Cited

U.S. PATENT DOCUMENTS

| | | |
|---|---|---|
| 2010/0098818 A1 | 4/2010 | Schweizer et al. |
| 2011/0274797 A1* | 11/2011 | Segall ............... A23J 1/14 426/253 |
| 2012/0130051 A1 | 5/2012 | Medina et al. |
| 2014/0356510 A1 | 12/2014 | Schweizer et al. |

FOREIGN PATENT DOCUMENTS

| | | |
|---|---|---|
| WO | 2011137524 A1 | 11/2011 |
| WO | 2014190418 A1 | 4/2014 |

OTHER PUBLICATIONS

Martha R. Bajec et al. "Astringency: Mechanisms and Perception", Critical Reviews in Food Science and Nutrition, vol. 48, No. 9, Sep. 10, 2008, pp. 858-875, XP055296846, USA.
Frutos et al. "Review. Tannins and ruminant nutrition", Spanish Journal of Agricultural Researh, 2(2), pp. 2004, 191-202.
Ann E. Hagerman et al. "Tannin Chemistry in Relation to Digestion", Journal of Range Management, 45(1), Jan. 1992 (Jan. 1992), pp. 57-62.

* cited by examiner

*Primary Examiner* — Elizabeth Gwartney

(57) ABSTRACT

Pulse proteins of reduced astringency are obtained by fractionating pulse protein products which are completely soluble and heat stable in aqueous media at acid pH value of less than about 4.4 into lower molecular weight, less astringent proteins and higher molecular weight, more astringent proteins.

8 Claims, No Drawings

PRODUCTION OF PULSE PROTEIN PRODUCT WITH REDUCED ASTRINGENCY

REFERENCE TO RELATED APPLICATIONS

This application is a continuation of copending U.S. patent application Ser. No. 14/290,415 filed May 29, 2014 which itself claims priority under 35 USC 119(e) from U. S. Provisional Patent Application No. 61/828,735 filed May 30, 2013 and 61/927,182 filed Jan. 14, 2014.

FIELD OF THE INVENTION

The present invention relates to the production of pulse protein products, preferably pulse protein isolates.

BACKGROUND TO THE INVENTION

In U.S. patent application Ser. No. 13/103,528 filed May 9, 2011 (US Patent Publication No. 2011-027497 published Nov. 10, 2011), Ser. No. 13/289,264 filed Nov. 4, 2011 (US Patent Publication No. 2012-0135117 published May 31, 2012), Ser. No. 12/556,357 filed Jul. 24, 2012 (US Patent Publication No. 2013-0189408 published Jul. 25, 2013) and Ser. No. 13/642,003 filed Jan. 7, 2013 (US Patent Publication No. 2013-0129901 published May 23, 2013), assigned to the assignee hereof and the disclosures of which are incorporated herein by reference, there is described the provision of a novel pulse protein product having a protein content of at least about 60 wt % (N×6.25) on a dry weight basis, preferably a pulse protein isolate having a protein content of at least about 90 wt % (N×6.25) d.b. The pulse protein product has a unique combination of properties, namely:

completely soluble in aqueous media at acid pH values of less than about 4.4
heat stable in aqueous media at acid pH values of less than about 4.4
does not require stabilizers or other additives to maintain the protein product in solution
is low in phytic acid
requires no enzymes in the production thereof This novel pulse protein product is prepared by a method which comprises:
(a) extracting a pulse protein source with an aqueous calcium salt solution, preferably an aqueous calcium chloride solution, to cause solubilization of pulse protein from the protein source and to form an aqueous pulse protein solution,
(b) separating the aqueous pulse protein solution from residual pulse protein source,
(c) optionally diluting the aqueous pulse protein solution,
(d) adjusting the pH of the aqueous pulse protein solution to a pH of about 1.5 to about 4.4, preferably about 2 to about 4, to produce an acidified pulse protein solution,
(e) optionally clarifying the acidified pulse protein solution if it is not already clear,
(f) alternatively from steps (b) to (e), optionally, diluting and then adjusting the pH of the combined aqueous pulse protein solution and residual pulse protein source to a pH of about 1.5 to about 4.4, preferably about 2 to about 4, then separating the acidified, preferably clear, pulse protein solution from residual pulse protein source,
(g) optionally concentrating the aqueous pulse protein solution while maintaining the ionic strength substantially constant by a selective membrane technique,
(h) optionally diafiltering the optionally concentrated pulse protein solution, and
(i) optionally drying the optionally concentrated and optionally diafiltered pulse protein solution.

The pulse protein product preferably is an isolate having a protein content of at least about 90 wt %, preferably at least about 100 wt % (N×6.25) d.b.

In certain acidic beverages, particularly those having a pH at the low end of the acceptable pH range for acidic beverages, the novel pulse protein product tends to induce an undesirable astringent sensation in the mouth.

SUMMARY OF THE INVENTION

It has now been found that this undesirable astringency can be reduced or eliminated by modifying the procedure used to manufacture the novel pulse protein product.

In accordance with the present invention, there is provided a method of preparing pulse protein product with reduced astringency, which comprises:
(a) extracting a pulse protein source with an aqueous calcium salt solution to cause solubilization of pulse protein from the protein source and to form an aqueous pulse protein solution,
(b) separating the aqueous pulse protein solution from residual pulse protein source,
(c) optionally diluting the aqueous pulse protein solution,
(d) adjusting the pH of the aqueous pulse protein solution to a pH of about 1.5 to about 4.4 to produce an acidified pulse protein solution,
(e) optionally clarifying the acidified pulse protein solution if it is not already clear,
(f) alternatively from steps (b) to (e), optionally, diluting and then adjusting the pH of the combined aqueous pulse protein solution and residual pulse protein source to a pH of about 1.5 to about 4.4 and then separating the acidified, preferably clear, pulse protein solution from residual pulse protein source, and
(g) fractionating the proteins in the acidified pulse protein solution to separate lower molecular weight, less astringent proteins from higher molecular weight, more astringent proteins.

In accordance with one aspect of the present invention, the process is modified to remove proteins which precipitate at a pH of about 5 to about 6.5 and that may interact with salivary proteins, thereby producing a less astringent product. In order to precipitate the protein fraction, the pH of the acidified pulse protein solution, preferably after partial concentration and diafiltration, is adjusted to about 5 to about 6.5, preferably about 5.5 to about 6.0. The precipitated protein is removed and the protein that remains in solution is then re-acidified to about pH 3 and further membrane processed to form one of the products of the invention. The collected material that precipitates upon pH adjustment may be further processed to provide another product of the invention The precipitated material may be processed as follows:

1. Optionally washed with water and spray dried at about pH 5.5 or
2. Optionally washed with water, adjusted to a pH of about 6 to 8 then spray dried, or
3. Adjusted to about pH 3, membrane processed then spray dried, or
4. Adjusted to about pH 3, membrane processed, adjusted in pH to about 6 to 8 then spray dried This product is intended typically for use in neutral applications.

The less astringent proteins that remain in solution when the aforementioned precipitation method is applied seem to be of lower molecular weight than the more astringent species. In another aspect of the present invention, the more astringent protein component may be separated from the less astringent protein component by membrane processing. Concentration and optional diafiltration of a protein solution containing a mixture of the more and less astringent proteins using a membrane with an appropriate pore size allows the smaller, less astringent proteins to pass through with the permeate, while retaining the more astringent species in the concentrated protein solution. The less astringent proteins may be separated from the contaminants by a subsequent ultrafiltration and/or diafiltration step using a membrane having a smaller pore size than that employed in the fractionation step. The purified less astringent protein fraction is a product of the invention. The solution of larger, more astringent protein species may also be further processed and optionally neutralized to form another product of the invention, which is typically intended for use in neutral applications.

In accordance with a further aspect of the present invention, there is provided a pulse protein product having a protein content of at least about 60% wt % (N×6.25) d.b. and which
- is completely soluble in aqueous media at acid pH values of less than 4.4
- is heat stable in aqueous media at acid values of less than about 4.4
- does not require stabilizers or other additives to maintain the protein product in solution or suspension
- is low in phytic acid
- requires no enzymes in the production thereof
- is low in astringency when tasted in aqueous solution at a pH below about 5.

The pulse protein product preferably has a protein content of at least about 90 wt %, more preferably 100 wt %, (N×6.25) d.b. The pulse protein product preferably is not hydrolysed and preferably has a phytic acid content of less than about 1.5 wt %, preferably less than about 0.5 wt %.

In accordance with a further aspect of the present invention, there is provided a pulse protein product having a protein content of at least about 60 wt % (N×6.25) d.b. and having low astringency when tasted in aqueous solution at a pH of below about 5 which is substantially completely soluble in an aqueous medium at a pH of less than about 4.4.

The pulse protein product may be blended with water-soluble powdered materials for the production of aqueous solutions of the blend, preferably a powdered beverage. The pulse protein product may be formed with an aqueous solution, such as, a beverage, which is heat stable at a temperature of less than about 4.4. The beverage may be a clear beverage in which the dissolved pulse protein product is completely soluble and transparent or may be a non-transparent beverage in which the dissolved pulse protein does or does not increase the cloud or haze level.

In accordance with a further aspect of the present invention, there is provided a pulse protein product having a molecular weight profile, as determined by the methods described in Example 25, which is
- about 10 to about 75% greater than about 100,000 Da
- about 10 to about 45% from about 15,000 to about 100,000 Da
- about 8 to about 55% from about 5,000 to about 15,000 Da
- about 2 to about 12% from about 1,000 to about 5,000 Da.

The molecular weight profile may be:
- about 15 to about 40% greater than about 100,000 Da
- about 25 to about 40% from about 15,000 to about 100,000 Da
- about 15 to about 50% from about 5,000 to about 15,000 Da
- about 3 to about 10% from about 1,000 to about 5,000 Da.

In accordance with another aspect of the present invention, there is provided a pulse protein product having a molecular weight profile, as determined by the methods described in Example 25, which is
- about 10 to about 85% greater than about 100,000 Da
- about 10 to about 45% from about 15,000 to about 100,000 Da
- about 0 to about 40% from about 5,000 to about 15,000 Da
- about 1 to about 34% from about 1,000 to about 5,000 Da.

The molecular weight profile may be:
- about 18 to about 78% greater than about 100,000 Da
- about 15 to about 38% from about 15,000 to about 100,000 Da
- about 2 to about 35% from about 5,000 to about 15,000 Da
- about 3 to about 25% from about 1,000 to about 5,000 Da.

In accordance with a yet further aspect of the present invention, there is provided a pulse protein product which has a protein content of at least about 60 wt % (N×6.25) d.b. which has a solubility at 1% protein w/v in water at a pH of about 2 to about 7 of greater than about 50%, as determined by the methods described in Example 5. The pulse protein product preferably has a protein content of at least about 90 wt %, more preferably at least about 100 wt % (N×6.25) d.b.

The less astringent pulse protein products of the invention, produced according to the processes herein are suitable, not only for protein fortification of acid media, but may be used in a wide variety of conventional applications of protein products, including but not limited to protein fortification of processed foods and beverages, emulsification of oils and as a foaming agent in products which entrap gases. The pulse protein products may also be used in nutritional supplements. The pulse protein products may also be used in dairy analogue or dairy alternative products or products that are dairy/plant ingredient blends. Other uses of the pulse protein products are in pet foods, animal feed and in industrial and cosmetic applications and in personal care products.

General Description of Invention

The initial step of the process of providing the pulse protein products involves solubilizing pulse protein from a pulse protein source. The pulses to which the invention may be applied include, but are not limited to lentils, chickpeas, dry peas and dry beans. The pulse protein source may be pulses or any pulse product or by-product derived from the processing of pulses. For example, the pulse protein source may be a flour prepared by grinding an optionally dehulled pulse. As another example, the pulse protein source may be a protein-rich pulse fraction formed by dehulling and grinding a pulse and then air classifying the dehulled and ground material into starch-rich and protein-rich fractions. The pulse protein product recovered from the pulse protein source may be the protein naturally occurring in pulses or the proteinaceous material may be a protein modified by genetic manipulation but possessing characteristic hydrophobic and polar properties of the natural protein.

Protein solubilization from the pulse protein source material is effected most conveniently using calcium chloride solution, although solutions of other calcium salts may be used. In addition, other alkaline earth metal compounds may be used, such as magnesium salts. Further, extraction of the pulse protein from the pulse protein source may be effected using calcium salt solution in combination with another salt solution, such as sodium chloride. Additionally, extraction of the pulse protein from the pulse protein source may be effected using water or other salt solution, such as sodium chloride, with calcium salt subsequently being added to the aqueous pulse protein solution produced in the extraction step. Precipitate formed upon addition of the calcium salt is removed prior to subsequent processing.

As the concentration of the calcium salt solution increases, the degree of solubilization of protein from the pulse protein source initially increases until a maximum value is achieved. Any subsequent increase in salt concentration does not increase the total protein solubilized. The concentration of calcium salt solution which causes maximum protein solubilization varies depending on the salt concerned. It is usually preferred to utilize a concentration value less than about 1.0 M, and more preferably a value of about 0.10 to about 0.15 M.

In a batch process, the salt solubilization of the protein is effected at a temperature of from about 1° to about 100° C., preferably about 15° C. to about 65° C., more preferably about 20° to about 35° C., preferably accompanied by agitation to decrease the solubilization time, which is usually about 1 to about 60 minutes. It is preferred to effect the solubilization to extract substantially as much protein from the pulse protein source as is practicable, so as to provide an overall high product yield.

In a continuous process, the extraction of the protein from the pulse protein source is carried out in any manner consistent with effecting a continuous extraction of protein from the pulse protein source. In one embodiment, the pulse protein source is continuously mixed with the calcium salt solution and the mixture is conveyed through a pipe or conduit having a length and at a flow rate for a residence time sufficient to effect the desired extraction in accordance with the parameters described herein. In such a continuous procedure, the salt solubilization step is effected in a time of about 1 minute to about 60 minutes, preferably to effect solubilization to extract substantially as much protein from the pulse protein source as is practicable. The solubilization in the continuous procedure is effected at temperatures between about 1° and about 100° C., preferably between about 15° C. and about 65° C., more preferably between about 20° and about 35° C.

The extraction is generally conducted at a pH of about 4.5 to about 11, preferably about 5 to about 7. The pH of the extraction system (pulse protein source and calcium salt solution) may be adjusted to any desired value within the range of about 4.5 to about 11 for use in the extraction step by the use of any convenient food grade acid, usually hydrochloric acid or phosphoric acid, or food grade alkali, usually sodium hydroxide, as required.

The concentration of pulse protein source in the calcium salt solution during the solubilization step may vary widely. Typical concentration values are about 5 to about 15% w/v.

The protein extraction step with the aqueous salt solution has the additional effect of solubilizing fats which may be present in the pulse protein source, which then results in the fats being present in the aqueous phase.

The protein solution resulting from the extraction step generally has a protein concentration of about 5 to about 50 g/L, preferably about 10 to about 50 g/L.

The aqueous calcium salt solution may contain an antioxidant. The antioxidant may be any convenient antioxidant, such as sodium sulfite or ascorbic acid. The quantity of antioxidant employed may vary from about 0.01 to about 1 wt % of the solution, preferably about 0.05 wt %. The antioxidant serves to inhibit oxidation of any phenolics in the protein solution.

The aqueous phase resulting from the extraction step then may be separated from the residual pulse protein source, in any convenient manner, such as by employing a decanter centrifuge, followed by disc centrifugation and/or filtration, to remove residual pulse protein source material. The separation step may be conducted at any temperature within the range of about 10 to about 100° C., preferably about 15° to about 65° C., more preferably about 20° to about 35° C. Alternatively, the optional dilution and acidification steps described below may be applied to the mixture of aqueous pulse protein solution and residual pulse protein source, with subsequent removal of the residual pulse protein source material by the separation step described above. The separated residual pulse protein source may be dried for disposal or further processed, such as to recover starch and/or residual protein. Residual protein may be recovered by re-extracting the separated residual pulse protein source with fresh calcium salt solution and the protein solution yielded upon clarification combined with the initial protein solution for further processing as described below. Alternatively, the separated residual pulse protein source may be processed by a conventional isoelectric precipitation process or any other convenient procedure to recover residual protein.

The aqueous pulse protein solution may be treated with an anti-foamer, such as any suitable food-grade, non-silicone based anti-foamer, to reduce the volume of foam formed upon further processing. The quantity of anti-foamer employed is generally greater than about 0.0003% w/v. Alternatively, the anti-foamer in the quantity described may be added in the extraction steps.

The separated aqueous pulse protein solution may be subject to a defatting operation, if required, as described in U.S. Pat. Nos. 5,844,086 and 6,005,076, assigned to the assignee hereof and the disclosures of which are incorporated herein by reference. Alternatively, defatting of the separated aqueous pulse protein solution may be achieved by any other convenient procedure.

The aqueous pulse protein solution may be treated with an adsorbent, such as powdered activated carbon or granulated activated carbon, to remove colour and/or odour compounds. Such adsorbent treatment may be carried out under any convenient conditions, generally at the ambient temperature of the separated aqueous protein solution. For powdered activated carbon, an amount of about 0.025% to about 5% w/v, preferably about 0.05% to about 2% w/v, is employed. The adsorbing agent may be removed from the pulse protein solution by any convenient means, such as by filtration.

The resulting aqueous pulse protein solution may be diluted generally with about 0.1 to about 10 volumes, preferably about 0.5 to about 2 volumes of aqueous diluent, in order to decrease the conductivity of the aqueous pulse protein solution to a value of generally below about 105 mS, preferably about 4 to about 21 mS. Such dilution is usually effected using water, although dilute salt solution, such as sodium chloride or calcium chloride, having a conductivity up to about 3 mS, may be used.

The diluent with which the pulse protein solution is mixed generally has the same temperature as the pulse protein solution, but the diluent may have a temperature of about 1° to about 100° C., preferably about 150 to about 65° C., more preferably about 20° to about 35° C.

The optionally diluted pulse protein solution then is adjusted in pH to a value of about 1.5 to about 4.4, preferably about 2 to about 4, by the addition of any suitable food grade acid, such as hydrochloric acid or phosphoric acid, to result in an acidified aqueous pulse protein solution, preferably a clear acidified aqueous pulse protein solution. The acidified aqueous pulse protein solution has a conductivity of generally below about 110 mS for a diluted pulse protein solution, or generally below about 115 mS for an undiluted pulse protein solution, in both cases preferably about 4 to about 26 mS.

As mentioned above, as an alternative to the earlier separation of the residual pulse protein source, the aqueous pulse protein solution and the residual pulse protein source material, may be optionally diluted and acidified together and then the acidified aqueous pulse protein solution is clarified and separated from the residual pulse protein source material by any convenient technique as discussed above. The acidified aqueous pulse protein solution may optionally be defatted, optionally treated with an adsorbent and optionally treated with defoamer as described above.

The acidified aqueous pulse protein solution may be subjected to a heat treatment to inactivate heat labile anti-nutritional factors, such as trypsin inhibitors, present in such solution as a result of extraction from the pulse protein source material during the extraction step. Such a heating step also provides the additional benefit of reducing the microbial load. Generally, the protein solution is heated to a temperature of about 70° to about 160° C., preferably about 80° to about 120° C., more preferably about 85° to about 95° C., for about 10 seconds to about 60 minutes, preferably about 10 seconds to about 5 minutes, more preferably about 30 seconds to about 5 minutes. The heat treated acidified pulse protein solution then may be cooled for further processing as described below, to a temperature of about 2° to about 65° C., preferably about 50° C. to about 60° C.

If the optionally diluted, acidified and optionally heat treated pulse protein solution is not transparent it may be clarified by any convenient procedure such as filtration or centrifugation.

In accordance with one aspect of the present invention, the acidified aqueous pulse protein solution, preferably following the concentration and diafiltration steps described below, more preferably following effecting partial concentration and diafiltration steps described below, is adjusted in pH to the range of about 5 to about 6.5, preferably about 5.5 to about 6.0 to effect protein precipitation and fractionation. Such pH adjustment may be effected using any convenient food grade alkali, such as aqueous sodium hydroxide solution. The protein that precipitates at such pH is collected by any convenient means such as centrifugation and the resulting solution is re-acidified to a pH of about 1.5 to about 4.4, preferably about 2 to about 4, by the addition of any suitable food grade acid, such as hydrochloric acid or phosphoric acid, to result in a re-acidified aqueous pulse protein solution, preferably a clear re-acidified aqueous pulse protein solution. This re-acidified aqueous pulse protein solution contains the less astringent protein species. The re-acidified aqueous pulse protein solution then is processed according to the steps described below.

The protein precipitated at about pH 5 to about 6.5 and separated from the resulting solution may be further processed. The precipitate, which is the more astringent protein fraction, may be washed with water and then dried by any convenient procedure such as spray drying or freeze drying. Alternatively, the precipitate may be washed with water, adjusted in pH to about 6 to 8 and then dried. The precipitate may be adjusted to a pH of about 1.5 to about 4.4, preferably about 2 to about 4, then membrane processed as described below and dried. The precipitate may be adjusted to a pH of about 1.5 to about 4.4, preferably about 2 to about 4, membrane processed as described below, adjusted in pH to about 6 to about 8, and then dried.

The acidified aqueous pulse protein solution may be concentrated prior to fractionation by pH adjustment as described above. Such a concentration step increases the protein concentration of the solution while maintaining the ionic strength thereof substantially constant. Such a concentration step generally is effected to provide a concentrated pulse protein solution having a protein concentration of about 50 to about 300 g/L, preferably about 100 to about 200 g/L. When the acidified aqueous protein solution is partially concentrated before precipitation and removal of the more astringent protein at pH about 5 to about 6.5, the concentration step is effected preferably to a protein concentration of below about 50 g/L. The concentrated or partially concentrated acidified aqueous solution may be diluted with water prior to the pH adjustment step in order to reduce the viscosity of the sample and facilitate the recovery of the protein precipitated by the pH adjustment.

The re-acidified aqueous pulse protein solution may also be concentrated to increase the protein concentration thereof while maintaining the ionic strength thereof substantially constant. Such a concentration step generally is effected to provide a concentrated re-acidified pulse protein solution having a protein concentration of about 10 to about 300 g/L, preferably about 100 to about 200 g/L. When the re-acidified aqueous protein solution is partially concentrated, the concentration step is effected preferably to a protein concentration of less than about 10 g/L.

Such concentration steps may be effected in any convenient manner consistent with batch or continuous operation, such as by employing any convenient selective membrane technique, such as ultrafiltration or diafiltration, using membranes, such as hollow-fibre membranes or spiral-wound membranes, with a suitable molecular weight cut-off such as about 1,000 to about 1,000,000 daltons, preferably about 1,000 to about 100,000 daltons, more preferably about 1,000 to about 10,000 daltons having regard to differing membrane materials and configurations, and, for continuous operation, dimensioned to permit the desired degree of concentration as the aqueous protein solution passes through the membranes.

As is well known, ultrafiltration and similar selective membrane techniques permit low molecular weight species to pass therethrough while preventing higher molecular weight species from so doing. The low molecular weight species include not only the ionic species of the salt but also low molecular weight materials extracted from the source material, such as carbohydrates, pigments and low molecular weight proteins including the less astringent proteins (discussed below) and the anti-nutritional trypsin inhibitors. The molecular weight cut-off of the membrane is usually chosen to ensure retention of a significant proportion of the protein in the solution, while permitting contaminants to pass through having regard to the different membrane materials and configurations.

The concentrated acidified or concentrated re-acidified pulse protein solution may be subjected to a diafiltration step using water or a dilute saline solution. The diafiltration solution may be at its natural pH or at a pH equal to that of the protein solution being diafiltered or at any pH value in between. Such diafiltration may be effected using from about 1 to about 40 volumes of diafiltration solution, preferably about 2 to about 25 volumes of diafiltration solution. In the diafiltration operation, further quantities of contaminants are removed from the aqueous pulse protein solution by passage through the membrane with the permeate. This purifies the aqueous protein solution and may also reduce its viscosity. The diafiltration operation may be effected until no significant further quantities of contaminants or visible colour are present in the permeate or in the case of the re-acidified protein solution, until the retentate has been sufficiently purified so as, when dried, to provide a pulse protein isolate with a protein content of at least about 90 wt % (N×6.25) d.b. Such diafiltration may be effected using the same membrane as for the concentration step. However, if desired, the diafiltration step may be effected using a separate membrane with a different molecular weight cut-off, such as a membrane having a molecular weight cut-off in the range of about 1,000 to about 1,000,000 daltons, preferably about 1,000 to about 100,000 daltons, more preferably about 1,000 to about 10,000 daltons having regard to different membrane materials and configuration.

Alternatively, the diafiltration step may be applied to the acidified or re-acidified aqueous protein solution prior to concentration or to partially concentrated acidified or partially concentrated re-acidified aqueous protein solution. Diafiltration may also be applied at multiple points during the concentration process. When diafiltration is applied prior to concentration or to partially concentrated solution, the resulting diafiltered solution may then be fully concentrated. The viscosity reduction achieved by diafiltering multiple times as the protein solution is concentrated may allow a higher final, fully concentrated protein concentration to be achieved. In the case of the re-acidified protein solution, this reduces the volume of material to be dried.

An antioxidant may be present in the diafiltration medium during at least part of the diafiltration step. The antioxidant may be any convenient antioxidant, such as sodium sulfite or ascorbic acid. The quantity of antioxidant employed in the diafiltration medium depends on the materials employed and may vary from about 0.01 to about 1 wt %, preferably about 0.05 wt %. The antioxidant serves to inhibit the oxidation of any phenolics present in the concentrated pulse protein solution.

The concentration steps and the optional diafiltration steps may be effected at any convenient temperature, generally about 2° to about 65° C., preferably about 50° to about 60° C., and for the period of time to effect the desired degree of concentration. The temperature and other conditions used to some degree depend upon the membrane equipment used to effect the membrane processing, the desired protein concentration of the solution and the efficiency of the removal of contaminants to the permeate.

In accordance with another aspect of this invention, the concentration and optional diafiltration steps are operated on the aqueous acidified pulse protein solution in such a way as to separate the lower molecular weight, less astringent proteins from the higher molecular weight, more astringent proteins. When this process is employed the molecular weight cut-off of the concentration and diafiltration membranes are chosen to permit the smaller, less astringent proteins to pass to the permeate with the contaminants. Such concentration and diafiltration steps may be effected in any convenient manner consistent with batch or continuous operation, such as by employing any convenient selective membrane technique, such as microfiltration or ultrafiltration, using membranes, such as hollow-fibre membranes or spiral-wound membranes, with a suitable molecular weight cut-off, such as about 0.05 to about 0.1 µm, preferably about 0.08 to about 0.1 µm for microfiltration and about 10,000 to about 1,000,000 daltons, preferably about 100,000 to about 1,000,000 daltons for ultrafiltration, having regard to differing membrane materials and configurations, and, for continuous operation, dimensioned to permit the desired degree of concentration as the aqueous protein solution passes through the membranes. In the concentration step the acidified protein solution is concentrated to a protein concentration of about 50 to about 300 g/L, preferably about 100 to about 200 g/L. The concentrated protein solution then may be diafiltered with water or dilute salt solution. The diafiltration solution may be at its natural pH or at a pH equal to that of the protein solution being diafiltered or any pH value in between. Such diafiltration may be effected using from about 1 to about 40 volumes of diafiltration solution, preferably about 2 to about 25 volumes of diafiltration solution. The concentration and optional diafiltration steps may be effected at any convenient temperature, generally about 2° to about 65° C., preferably about 50° to about 60° C. The smaller less astringent proteins are captured in the permeate of the membrane processes along with other small molecule contaminants.

The less astringent proteins are then separated from the contaminants by subsequent concentration of the protein solution (step 1 permeate) by membrane processing such as ultrafiltration to a protein concentration of about 10 to about 300 g/L, preferably about 100 to about 200 g/L and optional diafiltration. When the protein solution (step 1 permeate) is partially concentrated, the concentration step is effected preferably to a protein concentration of less than about 10 g/L. The concentration and diafiltration steps are performed using a membrane having a lower molecular weight cut-off such as about 1,000 to about 100,000 daltons, preferably 1,000 to about 10,000 daltons operated as described above.

Additional products may be obtained from the retentate of the membrane fractionation process, which contains the more astringent proteins. This protein solution may be dried by any convenient means, with or without adjustment of the pH of the protein solution to about 6 to about 8 using food grade alkali.

The concentration and the optional diafiltration steps employed in the purification of the aqueous solutions of less astringent proteins derived from either the precipitation or membrane fractionation procedure may be effected herein in such a manner that the less astringent pulse protein product recovered contains less than about 90 wt % protein (N×6.25) d.b., such as at least about 60 wt % protein (N×6.25) db. By partially concentrating and/or partially diafiltering the aqueous pulse protein solution, it is possible to only partially remove contaminants. This protein solution may then be dried to provide a pulse protein product with lower levels of purity. The pulse protein product is highly soluble and able to produce less astringent protein solutions, preferably clear, less astringent protein solutions, under acidic conditions.

As alluded to earlier, pulses contain anti-nutritional trypsin inhibitors. The level of trypsin inhibitor activity in the final pulse protein product can be controlled by the manipulation of various process variables.

As noted above, heat treatment of the acidified aqueous pulse protein solution may be used to inactivate heat-labile trypsin inhibitors. The partially concentrated or fully concentrated acidified pulse protein solution may also be heat treated to inactivate heat labile trypsin inhibitors. Such a heat treatment may also be applied to the re-acidified pulse protein solution arising from the precipitation fractionation method or the solution of less astringent, lower molecular weight proteins arising from the membrane separation method, before or after partial or complete concentration. When the heat treatment is applied to a solution that is not already fully concentrated, the resulting heat treated solution may then be additionally concentrated.

Acidifying and membrane processing the pulse protein solution at a lower pH, such as 1.5 to 3, may reduce the trypsin inhibitor activity relative to processing the solution at higher pH, such as 3 to 4.4. When the protein solution is concentrated and diafiltered at the low end of the pH range, it may be desired to raise the pH of the retentate prior to drying. The pH of the concentrated and diafiltered protein solution may be raised to the desired value, for example pH 3, by the addition of any convenient food grade alkali, such as sodium hydroxide.

Further, a reduction in trypsin inhibitor activity may be achieved by exposing pulse materials to reducing agents that disrupt or rearrange the disulfide bonds of the inhibitors. Suitable reducing agents include sodium sulfite, cysteine and N-acetylcysteine.

The addition of such reducing agents may be effected at various stages of the overall process. The reducing agent may be added with the pulse protein source material in the extraction step, may be added to the clarified aqueous pulse protein solution following removal of residual pulse protein source material, may be added to the optionally diafiltered retentate before drying or may be dry blended with the dried pulse protein product. The addition of the reducing agent may be combined with the heat treatment step and membrane processing steps, as described above.

If it is desired to retain active trypsin inhibitors in the products, this can be achieved by eliminating or reducing the intensity of the heat treatment step, not utilizing reducing agents, operating the concentration and diafiltration steps at the higher end of the pH range, such as 3 to 4.4.

Any of the concentrated and optionally diafiltered protein solutions described above may be subject to a further defatting operation, if required, as described in U.S. Pat. Nos. 5,844,086 and 6,005,076. Alternatively, defatting of the concentrated and optionally diafiltered protein solutions may be achieved by any other convenient procedure.

Any of the concentrated and optionally diafiltered aqueous protein solutions described above may be treated with an adsorbent, such as powdered activated carbon or granulated activated carbon, to remove colour and/or odour compounds. Such adsorbent treatment may be carried out under any convenient conditions, generally at the ambient temperature of the concentrated protein solution. For powdered activated carbon, an amount of about 0.025% to about 5% w/v, preferably about 0.05% to about 2% w/v, is employed. The adsorbent may be removed from the pulse protein solution by any convenient means, such as by filtration.

The concentrated and optionally diafiltered aqueous pulse protein solutions or collected pulse protein precipitates described above may be dried by any convenient technique, such as spray drying or freeze drying. A pasteurization step may be effected on the pulse protein solutions or resuspended pulse protein precipitates prior to drying. Such pasteurization may be effected under any desired pasteurization conditions. Generally, the concentrated and optionally diafiltered pulse protein solution or resuspended pulse protein precipitate is heated to a temperature of about 55° to about 70° C., preferably about 60° to about 65° C., for about 30 seconds to about 60 minutes, preferably about 10 minutes to about 15 minutes. The pasteurized concentrated pulse protein solution or resuspended pulse protein precipitate then may be cooled for drying, preferably to a temperature of about 25° to about 40° C.

Each of the dry pulse protein products obtained by the procedures described above has a protein content greater than about 60 wt %. Preferably, the dry pulse protein products are isolates with a protein content in excess of about 90 wt % protein, preferably at least about 100 wt %, (N×6.25) d.b.

The less astringent pulse protein products produced herein are soluble in an acidic aqueous environment, making the products ideal for incorporation into beverages, both carbonated and uncarbonated, to provide protein fortification thereto. Such beverages have a wide range of acidic pH values, ranging from about 2.5 to about 5. The pulse protein products provided herein may be added to such beverages in any convenient quantity to provide protein fortification to such beverages, for example, at least about 5 g of the pulse protein per serving. The added pulse protein product dissolves in the beverage and the cloud or haze level of the beverage is not increased by thermal processing. The pulse protein product may be blended with dried beverage prior to reconstitution of the beverage by dissolution in water. In some cases, modification to the normal formulation of the beverages to tolerate the composition of the invention may be necessary where components present in the beverage may adversely affect the ability of the composition of the invention to remain dissolved in the beverage.

EXAMPLES

Example 1

This Example illustrates production of the reduced astringency pulse protein product of the invention utilizing methods where the acidified pulse protein solution is partially concentrated or concentrated and diafiltered prior to the precipitation of the more astringent protein by pH adjustment.

'a' kg of 'b' was combined with 'c' L of reverse osmosis purified (RO) water and the mixture stirred for 'd' minutes at ambient temperature. Insoluble material was removed and the sample partially clarified by centrifugation, yielding a protein solution having a protein concentration of 'e' wt %. To this protein solution was added 'f' kg of calcium chloride stock solution, prepared by dissolving 1 kg calcium chloride pellets (95.5%) per 9 L water 'g'. Insoluble material was removed and the sample clarified by centrifugation, yielding 'h' L of protein extract solution having a protein concentration of 'i' wt %. 'j' L of protein extract solution was combined with 'k' L of RO water and the pH of the sample lowered to 'l' with HCl solution (concentrated HCl diluted with an equal volume of water). 'm' L of acidified protein solution was clarified by running it on a microfiltration system equipped with a 0.80 µm pore size Membralox ceramic membrane operated at 'n' ° C. until 'o' L of permeate (clarified, acidified protein solution) was collected. 'p' L of 'q', having a protein content of 'r' wt % was 's' concentrated to 't' L using a PES ultrafiltration membrane having a pore size of 1,000 daltons operated at a temperature of about 'u' ° C. 'v' L of 'w' concentrated protein solution was then diafiltered with 'x' L of RO water at about 'y' ° C. to provide 'z' of diafiltered, 'aa' concentrated protein solution having a protein content of 'ab' wt %. The diafiltered, 'ac' concentrated protein solution was diluted with 'ad' L RO water and the pH adjusted to 'ae' with NaOH solution, which caused the formation of a precipitate. 'af' kg of wet precipitate was removed by centrifugation to provide 'ag' L of protein solution with a protein content of 'ah' wt %. The pH of the protein solution was lowered to 'ai' and then 'aj' L of re-acidified protein solution was polished by running the solution through a Membralox ceramic microfiltration membrane having a pore size of 0.80 µm and operated at 'ak' ° C. until 'al' L of permeate was collected. 'am' L of 'an' was then reduced in volume to 'ao' L by concentration on a PES ultrafiltration membrane having a pore size of 1,000 daltons operated at a temperature of about 'ap' ° C. The resulting 'aq' concentrated protein solution, having a protein content of 'ar' wt % was then diafiltered with 'as' L of RO water at about 'at' ° C. 'au' to provide 'av' kg of concentrated, diafiltered protein solution having a protein content of 'aw' wt %. This represented a yield of 'ax' % of the protein in the protein extract solution resulting from the clarification step after calcium chloride addition. 'ay' kg of concentrated, diafiltered protein solution was spray dried to yield a protein product, having a protein content of 'az' % (N×6.25) d.b., termed 'ba' 'bb'.

The 'af' kg of wet precipitate collected, having a protein content of 'bc', represented a yield of 'bd' % of the protein in the protein extract solution resulting from the clarification step after calcium chloride addition. 'be' kg of this precipitate was diluted with 'bf' kg water then the pH adjusted to 'bg' and the mixture pasteurized at about 'bh' for 'bi' minutes. The 'bj' sample was then spray dried to provide a dried protein product having a protein content of 'bk'% (N×625) d.b. that was termed 'ba' 'bl'.

The parameters 'a' to 'bl' are set forth in the following Table 1.

TABLE 1

Parameters for the production of protein products by the precipitation fractionation method

| ba | YP20-D23-13A | YP20-D24-13A | YP20-E02-13A | LE03-D02-14A |
|---|---|---|---|---|
| a | 30 | 30 | 60 | 36 |
| b | yellow pea protein concentrate | yellow pea protein concentrate | yellow pea protein concentrate | whole green lentil flour |
| c | 500 | 500 | 1000 | 600 |
| d | 30 | 30 | 30 | 10 |
| e | 2.69 | 2.68 | 2.67 | 1.27 |
| f | 63.14 | 65 | 137.34 | 80 |
| g | and the mixture stirred 15 minutes | and the mixture stirred 15 minutes | and the mixture stirred 15 minutes | N/A |
| h | 459 | 484 | 978 | 586 |
| i | 1.60 | 1.41 | 1.55 | 0.68 |
| j | 459 | 484 | 978 | 586 |
| k | 371 | 317 | 640 | 368 |
| l | 2.91 | 3.12 | 3.00 | 3.02 |
| m | 830 | 790 | N/A | N/A |
| n | 59 | 59 | N/A | N/A |
| o | NR | NR | N/A | N/A |
| p | 780 | 700 | 1585 | 975 |
| q | clarified acidified protein solution | clarified acidified protein solution | acidified protein solution | acidified protein solution |
| r | 0.81 | 0.74 | 0.81 | 0.40 |
| s | partially | N/A | N/A | partially |
| t | 120 | 72 | 215 | 50 |
| u | 57 | 57 | 58 | 58 |
| v | 120 | 72 | 215 | 50 |
| w | partially | N/A | N/A | partially |
| x | 240 | 144 | 430 | 100 |
| y | 60 | 61 | 59 | 60 |
| z | 120 L | 72 L | 220 L | 48.56 kg |
| aa | partially | N/A | N/A | N/A |
| ab | 4.04 | 5.57 | 5.62 | 5.13 |
| ac | partially | N/A | N/A | N/A |
| ad | 120 | 78 | 344 | NR |
| ae | 5.63 | 5.73 | about 5.5 | 6.10 |
| af | 33.50 | 31.12 | 105.36 | 16.14 |
| ag | 230.1 | 128.5 | 444 | 80 |
| ah | 0.40 | 0.51 | 0.36 | 0.65 |
| ai | 3.08 | 2.79 | 3.11 | 2.95 |
| aj | N/A | N/A | N/A | 80 |
| ak | N/A | N/A | N/A | 46 |
| al | N/A | N/A | N/A | 64 |
| am | 230 | 150 | 444 | 64 |
| an | re-acidified protein solution | re-acidified protein solution | re-acidified protein solution | clarified, re-acidified protein solution |
| ao | 78 | 25 | 32.5 | 22 |
| ap | 58 | 52 | 54 | 58 |
| aq | N/A | N/A | N/A | partially |
| ar | 1.16 | 1.91 | 4.62 | 0.62 |
| as | 78 | 25 | 32.5 | 22 |
| at | 60 | 59 | 60 | 59 |
| au | and then further concentrated | N/A | and then further concentrated | N/A |
| av | 34.56 | 29.14 | 24.86 | 21.00 |
| aw | 2.87 | 2.38 | 6.25 | 1.51 |
| ax | 13.5 | 10.1 | 10.2 | 8.0 |
| ay | 35.54 | 29.14 | 24.86 | 21.00 |
| az | 100.17 | 99.36 | 101.84 | 92.26 |
| bb | YP705 | YP705 | YP705 | LE705 |
| bc | 12.33 | 11.65 | 10.38 | 11.18 |
| bd | 56.3 | 53.2 | 72.2 | 45.2 |
| be | 8.5 | 8.94 | 24 | 16.14 |
| bf | 8.5 | 8.94 | 0 | 8.00 |
| bg | 7.07 | 6.82 | N/A | N/A |
| bh | N/A | N/A | N/A | 66 |
| bi | N/A | N/A | N/A | 15 |
| bj | N/A | N/A | N/A | pasteurized |
| bk | 102.58 | 102.49 | 101.44 | 102.08 |
| bl | YP705P | YP705P | YP705P | LE705P |

NA = not applicable
NR = not recorded

Example 2

This Example illustrates production of the reduced astringency pulse protein product of the invention according to the procedure where the acidified pulse protein solution is pH adjusted to precipitate the more astringent protein.

18 kg of yellow pea protein concentrate was combined with 300 L of reverse osmosis purified (RO) water and the mixture stirred for 30 minutes at ambient temperature. Insoluble material was removed and the sample partially clarified by centrifugation, yielding a protein solution having a protein concentration of 2.47 wt %. To this protein solution was added 51.1 kg of calcium chloride stock solution, prepared by dissolving 8.0 kg calcium chloride pellets (95.5%) in 72 L water. Insoluble material was removed and the sample clarified by centrifugation, yielding 295 L of protein extract solution having a protein concentration of about 1.32 wt %. The 295 L of protein extract solution was combined with 206 L of RO water and the pH of the sample lowered to 2.75 with HCl solution (concentrated HC diluted with an equal volume of water). 495 L of acidified protein solution having a protein content of 0.66 wt %, was then adjusted to pH 5.5 using 2M NaOH solution, resulting in the formation of a precipitate. 24.92 kg of precipitate was collected by centrifugation yielding 480 L of pulse protein solution having a protein concentration of 0.20 wt %. The pH of the sample was then adjusted to about 3 with diluted HCl solution and then 480 L of re-acidified pulse protein solution was concentrated to 28 L using a PES ultrafiltration membrane having a pore size of 1,000 daltons operated at a temperature of about 58° C. 28 L of concentrated protein solution was then diafiltered with 28 L of RO water at about 63° C. and further concentrated to provide 19.94 kg of concentrated, diafiltered protein solution having a protein content of 6.52 wt %. This represented a yield of 33.4% of the protein in the protein extract solution resulting from the clarification step after calcium chloride addition. 19.94 kg of concentrated, diafiltered protein solution was spray dried to yield a protein product, having a protein content of 96.07% (N×6.25) d.b., termed YP20-E13-13A YP705.

The 24.92 kg of wet precipitate collected, having a protein content of 7.83 wt % represented a yield of 50.1% of the protein in the protein extract solution resulting from the clarification step after calcium chloride addition. A14.76 kg aliquot of the precipitate was washed with an equal weight of RO water and then re-captured by centrifugation. This washed precipitate was suspended in fresh water and then spray dried. The dried protein product had a protein content of 95.02% (N×6.25) d.b. and was termed YP20-E13-13A YP705P-01. A second aliquot (10 kg) of the precipitate was suspended in water and spray dried without a wash step. The dried protein product had a protein content of 87.52 (N×6.25) d.b. and was termed YP20-E13-13A YP705P-02.

Example 3

This Example illustrates production of the reduced astringency pulse protein product of the invention according to the procedure where membrane processing is utilized to separate the less astringent proteins from the more astringent proteins. 'a' kg of 'b' was combined with 'c' L of reverse osmosis purified (RO) water and the mixture stirred for 10 minutes at ambient temperature. Insoluble material was removed and the sample partially clarified by centrifugation, yielding a protein solution having a protein concentration of 'd' wt %. To this protein solution was added 'e' g antifoam and 'f' kg of calcium chloride stock solution, prepared by dissolving 'g' kg calcium chloride pellets (95.5%) in 'h' L water. Insoluble material was removed and the sample clarified by centrifugation, yielding 'i' L of protein extract solution having a protein concentration of 'j' wt %. 'k' L of protein extract solution was combined with 'l' L of RO water and the pH of the sample lowered to about 'm' with HCl solution (concentrated HCl diluted with an equal volume of water). 'n' L of acidified pulse protein solution, having a protein concentration of 'o' wt %, was concentrated to 'p' using a polyvinylidene fluoride (PVDF) microfiltration membrane having a pore size of 0.08 μm operated at a temperature of about 'q' ° C. The microfiltration retentate was then diafiltered with 'r' L of RO water at about 's' ° C. and then the diafiltered retentate further reduced to 't' kg at about 'u' ° C. 'v' L of microfiltration/diafiltration permeate, having a protein concentration of 'w' wt %, was concentrated to 'x' L using a PES ultrafiltration membrane having a pore size of 1,000 daltons operated at a temperature of about 'y' C. The concentrated protein solution was then diafiltered with 'z' L of RO water at about 'aa' ° C. 'ab' to provide 'ac' kg of concentrated, diafiltered protein solution having a protein content of 'ad' wt %. This represented a yield of 'ac' % of the protein in the protein extract solution resulting from the clarification step after calcium chloride addition. 'af' kg of concentrated, diafiltered protein solution was spray dried to yield a protein product, having a protein content of 'ag' % (N×6.25) d.b., termed 'ah' 'ai'.

The 'aj' kg of 'ak' microfiltration retentate collected, having a protein content of 'al' wt % represented a yield of 'am' % of the protein in the protein extract solution resulting from the clarification step after calcium chloride addition. 'an' kg of concentrated and diafiltered microfiltration retentate was adjusted to pH 'ao' and then spray dried to form a protein product having a protein content of 'ap' % (N×6.25) d.b., termed 'ah' 'aq'

The parameters 'a' to 'ao' are set forth in the following Table 2.

TABLE 2

Parameters for the production of protein products by the membrane fractionation method

| ah | YP23-H12-13A | YP23-H14-13A | YP23-J02-13A | LE03-D01-14A |
|---|---|---|---|---|
| a | 24 | 24 | 60 | 36 |
| b | yellow pea protein concentrate | yellow pea protein concentrate | yellow pea protein concentrate | whole green lentil flour |
| c | 400 | 400 | 1008 | 600 |
| d | 3.11 | 2.92 | 3.16 | 1.25 |
| e | N/A | N/A | 19 | N/A |
| f | 54.6 | 56.0 | 135 | 79.36 |
| g | 6 | 6 | 20 | 10 |
| h | 54 | 54 | 180 | 90 |
| i | 398 | 398.8 | 934 | 604 |
| j | 1.66 | 1.60 | about 1.90 | 0.61 |
| k | 398 | 398.8 | 934 | 604 |
| l | 269 | 278.2 | 666 | 398 |
| m | 3.17 | 3.16 | 2.99 | 3.01 |
| n | 670 | 490 | 1440 | 1025 |
| o | 0.86 | 0.91 | 0.83 | 0.30 |
| p | 65 L | 28.04 kg | 180 L | 35 L |
| q | 59 | 55 | 55 | 56 |
| r | N/A | N/A | 180 | 80 |
| s | N/A | N/A | 55 | 55 |
| t | N/A | N/A | 140 | N/A |
| u | N/A | N/A | 55 | N/A |
| v | 600 | 458 | about 1470 | 1052 |
| w | 0.18 | 0.29 | 0.31 | 0.27 |
| x | 28 | 30 | 40 | 48 |
| y | 56 | 54 | 56 | 54 |
| z | 140 | 150 | 200 | 96 |
| aa | 59 | 59 | 58 | 61 |
| ab | and further concentrated | N/A | and further concentrated | and further concentrated |
| ac | 21.36 | 32.35 | 33.6 | 32.08 |
| ad | 3.43 | 2.44 | 5.02 | 2.09 |
| ae | 11.0 | 12.4 | 9.5 | 18.2 |
| af | 21.36 | 32.35 | 33.6 | 32.08 |
| ag | 101.64 | 98.24 | 99.78 | 93.52 |
| ai | YP706 | YP706 | YP706 | LE706 |
| aj | 65 L | 28.04 kg | 140 L | 32.12 |
| ak | concentrated | concentrated | concentrated and diafiltered | concentrated and diafiltered |
| al | 7.02 | 9.45 | 6.63 | 4.87 |
| am | 69.0 | 41.5 | 52.3 | 42.4 |
| an | N/A | N/A | 135 | 32.12 |
| ao | N/A | N/A | about 7 | 7.29 |
| ap | N/A | N/A | 91.60 | 94.64 |
| aq | N/A | N/A | YP706B | LE706B |

N/A = not applicable

Example 4

This Example contains an evaluation of the dry colour and colour in solution of the reduced astringency pulse protein products produced by the methods of Examples 1-3.

The colour of the dry powders was assessed using a HunterLab ColorQuest XE instrument in reflectance mode. The colour values are set forth in the following Table 3:

TABLE 3

HunterLab scores for dry reduced astringency pulse protein products

| Sample | L* | a* | b* |
|---|---|---|---|
| YP20-D23-13A YP705 | 89.33 | 0.02 | 5.75 |
| YP20-D24-13A YP705 | 88.55 | −0.14 | 5.73 |
| YP20-E02-13A YP705 | 89.14 | 0.26 | 6.68 |
| YP20-E13-13A YP705 | 86.90 | 0.90 | 8.55 |
| LE03-D02-14A LE705 | 88.09 | 1.07 | 5.54 |
| YP23-H12-13A YP706 | 88.23 | −0.09 | 6.35 |
| YP23-H14-13A YP706 | 88.53 | 0.22 | 6.78 |
| YP23-J02-13A YP706 | 87.25 | 0.75 | 7.45 |
| LE03-D01-14A LE706 | 85.94 | 0.84 | 7.92 |

As may be seen from Table 3, the reduced astringency pulse protein products were light in colour.

Solutions of the reduced astringency pulse protein products were prepared by dissolving sufficient protein powder to supply 0.48 g of protein in 15 ml of RO water. The pH of the solutions was measured with a pH meter and the colour and clarity assessed using a HunterLab Color Quest XE instrument operated in transmission mode. The results are shown in the following Table 4.

TABLE 4 pH and HunterLab scores for solutions of reduced astringency pulse protein products

| sample | pH | L* | a* | b* | haze |
|---|---|---|---|---|---|
| YP20-D23-13A YP705 | 3.35 | 97.2 | −0.10 | 6.42 | 22.9 |
| YP20-D24-13A YP705 | 2.93 | 97.91 | −0.40 | 5.81 | 8.2 |
| YP20-E02-13A YP705 | 3.39 | 97.76 | −0.33 | 5.52 | 9.9 |
| YP20-E13-13A YP705 | 3.26 | 95.33 | 0.05 | 9.69 | 29.8 |
| LE03-D02-14A LE705 | 3.21 | 96.33 | 0.66 | 7.18 | 4.5 |
| YP23-H12-13A YP706 | 3.72 | 94.65 | 0.01 | 9.20 | 14.9 |
| YP23-H14-13A YP706 | 3.57 | 96.07 | −0.25 | 8.99 | 7.7 |
| YP23-J02-13A YP706 | 3.51 | 96.55 | 0.09 | 9.7 | 17.2 |
| LE03-D01-14A LE706 | 3.42 | 93.86 | 0.60 | 12.8 | 21.5 |

As may be seen from the results in Table 4, the solutions of the reduced astringency pulse protein products were light in colour and generally low in haze.

Example 5

This Example contains an evaluation of the solubility in water of the reduced astringency pulse protein products produced by the methods of Examples 1 and 3. Solubility was tested based on protein solubility (termed protein method, a modified version of the procedure of Morr et al., J. Food Sci. 50:1715-1718) and total product solubility (termed pellet method).

Sufficient protein powder to supply 0.5 g of protein was weighed into a beaker and wetted by mixing with about 20-25 ml of reverse osmosis (RO) purified water. Additional water was then added to bring the volume to approximately 45 ml. The contents of the beaker were then slowly stirred for 60 minutes using a magnetic stirrer. The pH was determined immediately after dispersing the protein and was adjusted to the appropriate level (2, 3, 4, 5, 6 or 7) with diluted NaOH or HCl. A sample was also prepared at natural pH. For the pH adjusted samples, the pH was measured and corrected periodically during the 60 minutes stirring. After the 60 minutes of stirring, the samples were made up to 50 ml total volume with RO water, yielding a 1% w/v protein dispersion. The protein content of the dispersions was determined by combustion analysis using a Leco Nitrogen Determinator. Aliquots (20 ml) of the dispersions were then transferred to pre-weighed centrifuge tubes that had been dried overnight in a 100° C. oven then cooled in a desiccator and the tubes capped. The samples were centrifuged at 7,800 g for 10 minutes, which sedimented insoluble material and yielded a supernatant. The protein content of the supernatant was measured by combustion analysis and then the supernatant and the tube lids were discarded and the pellet material dried overnight in an oven set at 100° C. The next morning the tubes were transferred to a desiccator and allowed to cool. The weight of dry pellet material was recorded. The dry weight of the initial protein powder was calculated by multiplying the weight of powder used by a factor of ((100−moisture content of the powder (%))/100). Solubility of the product was then calculated two different ways:

Solubility (protein method) (%)=(% protein in supernatant/% protein in initial dispersion)×100   1)

Solubility (pellet method) (%)=(1−(weight dry insoluble pellet material/((weight of 20 ml of dispersion/weight of 50 ml of dispersion)×initial weight dry protein powder)))×100   2)

Values calculated as greater than 100% were reported as 100%.

The natural pH values of the 1% w/v protein solutions of the protein products produced in Examples 1 and 3 are shown in Table 5:

TABLE 5

Natural pH of reduced astringency pulse solutions prepared in water at 1% protein

| Batch | Product | Natural pH |
|---|---|---|
| YP20-D23-13A | YP705 | 3.36 |
| YP20-D24-13A | YP705 | 3.15 |
| YP20-E02-13A | YP705 | 3.22 |
| LE03-D02-14A | LE705 | 3.19 |
| YP23-H12-13A | YP706 | 3.74 |
| YP23-H14-13A | YP706 | 3.53 |
| LE03-D01-14A | LE706 | 3.40 |

The solubility results obtained are set forth in the following Tables 6 and 7:

TABLE 6

Solubility of products at different pH values based on protein method

| | | Solubility (protein method) (%) | | | | | | |
|---|---|---|---|---|---|---|---|---|
| Batch | Product | pH 2 | pH 3 | pH 4 | pH 5 | pH 6 | pH 7 | Nat. pH |
| YP20-D23-13A | YP705 | 100 | 100 | 95.4 | 94.4 | 90.1 | 96.1 | 98.1 |
| YP20-D24-13A | YP705 | 98.0 | 100 | 100 | 100 | 93.7 | 98.1 | 100 |
| YP20-E02-13A | YP705 | 96.9 | 100 | 100 | 99.0 | 98.9 | 93.1 | 100 |
| LE03-D02-14A | LE705 | 98.0 | 100 | 99.1 | 95.9 | 100 | 99.0 | 96.1 |
| YP23-H12-13A | YP706 | 99.0 | 100 | 100 | 80.2 | 78.4 | 92.9 | 95.2 |
| YP23-H14-13A | YP706 | 100 | 100 | 99.0 | 73.2 | 77.8 | 82.7 | 100 |

TABLE 6-continued

Solubility of products at different pH values based on protein method

| Batch | Product | Solubility (protein method) (%) | | | | | | |
|---|---|---|---|---|---|---|---|---|
| | | pH 2 | pH 3 | pH 4 | pH 5 | pH 6 | pH 7 | Nat. pH |
| LE03-D01-14A | LE706 | 93.3 | 100 | 100 | 64.6 | 59.8 | 64.6 | 100 |

TABLE 7

Solubility of products at different pH values based on pellet method

| Batch | Product | Solubility (pellet method) (%) | | | | | | |
|---|---|---|---|---|---|---|---|---|
| | | pH 2 | pH 3 | pH 4 | pH 5 | pH 6 | pH 7 | Nat. pH |
| YP20-D23-13A | YP705 | 97.4 | 98.8 | 98.4 | 94.8 | 92.9 | 93.7 | 98.6 |
| YP20-D24-13A | YP705 | 99.8 | 100 | 99.3 | 98.4 | 97.4 | 98.4 | 99.4 |
| YP20-E02-13A | YP705 | 99.8 | 99.8 | 100 | 96.4 | 96.9 | 97.9 | 99.1 |
| LE03-D02-14A | LE705 | 99.9 | 100 | 99.4 | 94.4 | 96.3 | 95.7 | 99.6 |
| YP23-H12-13A | YP706 | 99.8 | 99.9 | 99.1 | 82.0 | 79.7 | 87.8 | 100 |
| YP23-H14-13A | YP706 | 97.8 | 97.7 | 98.5 | 67.9 | 81.7 | 75.0 | 98.9 |
| LE03-D01-14A | LE706 | 96.8 | 97.2 | 96.3 | 67.1 | 54.7 | 68.6 | 97.4 |

As can be seen from the results presented in Tables 6 and 7, the reduced astringency pulse protein products were extremely soluble in the pH range 2-4 and also quite soluble in the pH range of 5-7.

Example 6

This Example contains an evaluation of the clarity in water of the reduced astringency pulse protein products produced by the methods of Examples 1 and 3.

The clarity of the 1% w/v protein solutions prepared as described in Example 5 was assessed by measuring the absorbance at 600 nm (water blank), with a lower absorbance score indicating greater clarity. Analysis of the samples on a HunterLab ColorQuest XE instrument in transmission mode also provided a percentage haze reading, another measure of clarity.

The clarity results are set forth in the following Tables 8 and 9:

TABLE 8

Clarity of protein solutions at different pH values as assessed by A600

| Batch | Product | A600 | | | | | | |
|---|---|---|---|---|---|---|---|---|
| | | pH 2 | pH 3 | pH 4 | pH 5 | pH 6 | pH 7 | Nat. pH |
| YP20-D23-13A | YP705 | 0.008 | 0.016 | 0.029 | 0.337 | 0.807 | 0.596 | 0.022 |
| YP20-D24-13A | YP705 | 0.013 | 0.012 | 0.021 | 0.076 | 0.309 | 0.213 | 0.012 |
| YP20-E02-13A | YP705 | 0.007 | 0.011 | 0.014 | 0.063 | 0.506 | 0.369 | 0.012 |
| LE03-D02-14A | LE705 | 0.010 | 0.012 | 0.073 | 0.062 | 0.027 | 0.026 | 0.014 |
| YP23-H12-13A | YP706 | 0.008 | 0.016 | 0.034 | 1.923 | 1.889 | 0.791 | 0.033 |

TABLE 8-continued

Clarity of protein solutions at different pH values as assessed by A600

| Batch | Product | A600 | | | | | | |
|---|---|---|---|---|---|---|---|---|
| | | pH 2 | pH 3 | pH 4 | pH 5 | pH 6 | pH 7 | Nat. pH |
| YP23-H14-13A | YP706 | 0.011 | 0.015 | 0.024 | 1.931 | 1.690 | 1.577 | 0.018 |
| LE03-D01-14A | LE706 | 0.019 | 0.025 | 0.050 | 2.424 | 2.412 | 2.426 | 0.024 |

TABLE 9

Clarity of protein solutions at different pH values as assessed by HunterLab haze analysis

| Batch | Product | HunterLab haze reading (%) | | | | | | |
|---|---|---|---|---|---|---|---|---|
| | | pH 2 | pH 3 | pH 4 | pH 5 | pH 6 | pH 7 | Nat. pH |
| YP20-D23-13A | YP705 | 0.5 | 5.6 | 13.0 | 73.6 | 90.8 | 85.3 | 9.7 |
| YP20-D24-13A | YP705 | 0.0 | 1.7 | 6.4 | 23.1 | 65.7 | 50.3 | 2.2 |
| YP20-E02-13A | YP705 | 0.0 | 0.8 | 3.2 | 16.0 | 79.5 | 68.5 | 1.0 |
| LE03-D02-14A | LE705 | 0.3 | 1.2 | 19.8 | 16.7 | 3.6 | 1.8 | 1.8 |
| YP23-H12-13A | YP706 | 0.0 | 1.0 | 4.4 | 96.0 | 95.8 | 87.9 | 4.7 |
| YP23-H14-13A | YP706 | 0.0 | 0.5 | 2.3 | 95.9 | 95.7 | 95.5 | 1.1 |
| LE03-D01-14A | LE706 | 3.3 | 4.9 | 12.6 | 100.3 | 101.3 | 101.3 | 4.3 |

As can be seen from the results of Tables 8 and 9, the reduced astringency pulse protein products generally provided transparent solutions at pH 2-4.

Example 7

This Example contains an evaluation of the solubility in a soft drink (Sprite) and sports drink (Orange Gatorade) of the reduced astringency pulse protein products produced by the methods of Examples 1 and 3. The solubility was determined with the protein added to the beverages with no pH correction and again with the pH of the protein fortified beverages adjusted to the level of the original beverages.

When the solubility was assessed with no pH correction, a sufficient amount of protein powder to supply 1 g of protein was weighed into a beaker and wetted by mixing with about 20-25 ml of beverage. Additional beverage was then added to bring the volume to 50 ml, and then the solutions were stirred slowly on a magnetic stirrer for 60 minutes to yield a 2% protein w/v dispersion. The protein content of the samples was determined by combustion analysis using a Leco Nitrogen Determinator then an aliquot of the protein containing beverages was centrifuged at 7,800 g for 10 minutes and the protein content of the supernatant measured.

Solubility (%)=(% protein in supernatant/% protein in initial dispersion)×100.

Values calculated as greater than 100% were reported as 100%.

When the solubility was assessed with pH correction, the pH of the soft drink (Sprite) and sports drink (Orange Gatorade) without protein was measured. A sufficient amount of protein powder to supply 1 g of protein was weighed into a beaker and wetted by mixing with about 20-25 ml of beverage. Additional beverage was added to bring the volume to approximately 45 ml, and then the solutions were stirred slowly on a magnetic stirrer for 60 minutes. The pH of the protein containing beverages was determined immediately after dispersing the protein and was adjusted to the original no-protein pH with HCl or NaOH as necessary. The pH was measured and corrected periodically during the 60 minutes stirring. After the 60 minutes of stirring, the total volume of each solution was brought to 50 ml with additional beverage, yielding a 2% protein w/v dispersion. The protein content of the samples was determined by combustion analysis using a Leco Nitrogen Determinator then an aliquot of the protein containing beverages was centrifuged at 7,800 g for 10 minutes and the protein content of the supernatant measured.

Solubility (%)=(% protein in supernatant/% protein in initial dispersion)×100

Values calculated as greater than 100% were reported as 100%.

The results obtained are set forth in the following Table 10:

TABLE 10

Solubility of reduced astringency pulse protein products in Sprite and Orange Gatorade

| | | no pH correction | | pH correction | |
| --- | --- | --- | --- | --- | --- |
| Batch | Product | Solubility (%) in Sprite | Solubility (%) in Orange Gatorade | Solubility (%) in Sprite | Solubility (%) in Orange Gatorade |
| YP20-D23-13A | YP705 | 100 | 98.0 | 97.0 | 100 |
| YP20-D24-13A | YP705 | 100 | 97.5 | 99.5 | 99.0 |
| YP20-E02-13A | YP705 | 100 | 100 | 100 | 100 |
| LE03-D02-14A | LE705 | 100 | 100 | 98.5 | 100 |
| YP23-H12-13A | YP706 | 100 | 99.0 | 97.0 | 96.0 |
| YP23-H14-13A | YP706 | 98.5 | 99.5 | 98.0 | 92.1 |
| LE03-D01-14A | LE706 | 92.6 | 98.9 | 93.3 | 100 |

As can be seen from the results of Table 10, the reduced astringency pulse protein products were highly soluble in the Sprite and the Orange Gatorade.

Example 8

This Example contains an evaluation of the clarity in a soft drink and sports drink of the reduced astringency pulse protein products produced by the methods of Examples 1 and 3.

The clarity of the 2% w/v protein dispersions prepared in soft drink (Sprite) and sports drink (Orange Gatorade) in Example 7 were assessed using the HunterLab haze method described in Example 6.

The results obtained are set forth in the following Table 11:

TABLE 11

HunterLab haze readings for reduced astringency pulse protein products in Sprite and Orange Gatorade

| | | no pH correction | | pH correction | |
| --- | --- | --- | --- | --- | --- |
| Batch | Product | Haze (%) in Sprite | Haze (%) in Orange Gatorade | Haze (%) in Sprite | Haze (%) in Orange Gatorade |
| no protein | | 0.0 | 82.6 | 0.0 | 82.6 |
| YP20-D23-13A | YP705 | 17.8 | 70.6 | 21.8 | 72.2 |

TABLE 11-continued

HunterLab haze readings for reduced astringency pulse protein products in Sprite and Orange Gatorade

| | | no pH correction | | pH correction | |
| --- | --- | --- | --- | --- | --- |
| Batch | Product | Haze (%) in Sprite | Haze (%) in Orange Gatorade | Haze (%) in Sprite | Haze (%) in Orange Gatorade |
| YP20-D24-13A | YP705 | 9.4 | 79.7 | 12.5 | 76.3 |
| YP20-E02-13A | YP705 | 8.5 | 86.2 | 20.2 | 86.5 |
| LE03-D02-14A | LE705 | 1.4 | 85.4 | 1.7 | 85.0 |
| YP23-H12-13A | YP706 | 10.2 | 84.7 | 6.4 | 79.9 |
| YP23-H14-13A | YP706 | 4.5 | 80.6 | 7.3 | 78.7 |
| LE03-D01-14A | LE706 | 11.5 | 77.5 | 12.1 | 78.9 |

As can be seen from the results of Table 11, the addition of the reduced astringency pulse protein products to the soft drink and sports drink added little or no haziness.

Example 9

This Example contains an evaluation of the heat stability in water of the reduced astringency pulse protein products produced by the methods of Examples 1 and 3.

2% w/v protein solutions of the protein products were prepared in RO water. The pH of the solutions was determined with a pH meter and then adjusted to about 3.0 with HCl solution. The clarity of the solutions was assessed by haze measurement with the HunterLab Color Quest XE instrument operated in transmission mode. The solutions were then heated to 95° C., held at this temperature for 30 seconds and then immediately cooled to room temperature in an ice bath. The clarity of the heat treated solutions was then measured again.

The clarity of the protein solutions before and after heating is set forth in the following Table 12:

TABLE 12

Effect of heat treatment on clarity of 2% w/v protein solutions of reduced astringency pulse protein products

| Batch | Product | haze before heat treatment (%) | haze after heat treatment (%) |
| --- | --- | --- | --- |
| YP20-D23-13A | YP705 | 13.0 | 0.0 |
| YP20-D24-13A | YP705 | 4.2 | 0.0 |
| YP20-E02-13A | YP705 | 5.5 | 1.4 |
| LE03-D02-14A | LE705 | 1.0 | 0.0 |
| YP23-H12-13A | YP706 | 5.0 | 2.0 |
| YP23-H14-13A | YP706 | 3.3 | 2.2 |
| LE03-D01-14A | LE706 | 6.3 | 1.6 |

As can be seen from the results in Table 13, the solutions of reduced astringency pulse protein product were substantially clear before heat treatment and the level of haze was actually reduced by the heat treatment.

Example 10

This Example illustrates the production of pulse protein products by the method described in U.S. patent application Ser. No. 13/556,357.

'a' kg of 'b' was combined with 'c' L of 'd' at 'e' and agitated for 'f' minutes. 'g' kg of calcium chloride pellets (95.5%) dissolved in 'h' L of RO water was then added and the mixture stirred for an additional 'i' minutes. The residual solids were removed by centrifugation to produce a centrate having a protein content of 'j' % by weight. 'k' L of centrate was added to 'l' L of RO water at 'm' and the pH of the sample lowered to 'n' with diluted HCl. The diluted and acidified centrate was further clarified by filtration to provide a clear protein solution with a protein content of 'o' % by weight.

The filtered protein solution was reduced in volume from 'p' L to 'q' L by concentration on a polyethersulfone membrane, having a molecular weight cutoff of 'r' daltons, operated at a temperature of about 's' °C. At this point the protein solution, with a protein content of 't' wt %, was diafiltered with 'u' L of RO water, with the diafiltration operation conducted at about 'v' °C. The diafiltered protein solution was then further concentrated to 'w' kg, having a protein content of 'x' wt %, then diluted with RO water to a protein content of 'y' wt % to facilitate spray drying. The protein solution before spray drying, having a weight of 'z' kg was recovered in a yield of 'aa' % of the initial centrate that was further processed. The concentrated and diafiltered protein solution was then dried to yield a product found to have a protein content of 'ab' wt % (N×6.25) d.b. The product was given designation 'ac'.

The parameters 'a' to 'ac' are set forth in the following Table 13.

TABLE 13

Parameters for the runs to produce pulse 701 products

| | ac | | |
|---|---|---|---|
| | YP01-E19-11A YP701 | YP05-A18-12A YP701 | LE01-J24-13A LE701 |
| a | 20 | 70 | 20 |
| b | Yellow split pea flour | Yellow split pea flour | whole green lentil flour |
| c | 200 | 300 | 200 |
| d | 0.15M CaCl$_2$ | RO water | 0.13M CaCl$_2$ |
| e | 60° C. | 30° C. | Ambient temperature |
| f | 30 | 60 | 30 |
| g | 0 | 4.52 | 0 |
| h | 0 | 10 | 0 |
| i | 0 | 30 | 0 |
| j | 1.32 | 2.92 | 1.65 |
| k | 186.5 | 223.3 | 146.2 |
| l | 225.8 | 223.0 | 147.7 |
| m | 60° C. | Ambient temperature | Ambient temperature |
| n | 3.34 | 3.04 | 2.65 |
| o | 0.58 | 1.25 | 0.62 |
| p | 400 | 550 | 295 |
| q | 35 | 101 | 25 |
| r | 100,000 | 10,000 | 100,000 |
| s | 58 | 53 | 30 |
| t | 4.94 | 4.05 | 4.23 |
| u | 350 | 202 | 250 |
| v | 60 | 53 | 32 |
| w | 21.52 | 34.78 | 21.60 |
| x | 7.54 | 10.02 | 4.69 |
| y | N/A | 5.00 | N/A |
| z | 21.52 | 57.90 | 21.60 |
| aa | 65.9 | 44.5 | 41.9 |
| ab | 103.19 | 101.99 | 103.11 |

N/A = not applicable

Example 11

This Example illustrates a comparison of the astringency level of the YP20-D24-13A YP705 prepared as described in Example 1 with that of the YP01-E19-11A YP701 prepared as described in Example 10.

Samples were prepared for sensory evaluation by dissolving sufficient protein powder to supply 5 g protein in 250 ml of purified drinking water. The initial pH of the YP705 solution was 3.09 and it was adjusted to about 3.50 with food grade sodium hydroxide solution. The initial pH of the YP701 solution was 3.92 and it was adjusted to about 3.50 with food grade hydrochloric acid. An informal panel of seven panellists was asked to blindly taste the samples and indicate which was less astringent.

Five out of seven panellists indicated that the YP20-D24-13A YP705 was less astringent.

Example 12

This Example illustrates a comparison of the astringency level of the YP20-E02-13A YP705 prepared as described in Example 1 with that of the YP01-E19-11A YP701 prepared as described in Example 10.

Samples were prepared for sensory evaluation by dissolving sufficient protein powder to supply 5 g protein in 250 ml of purified drinking water. The initial pH of the YP705 solution was 3.38 and it was adjusted to about 3.50 with food grade sodium hydroxide solution. The initial pH of the YP701 solution was 3.94 and it was adjusted to about 3.50 with food grade hydrochloric acid. An informal panel of seven panellists was asked to blindly taste the samples and indicate which was less astringent.

Five out of seven panellists indicated that the YP20-E02-13A YP705 was less astringent.

Example 13

This Example illustrates a comparison of the astringency level of the YP20-E13-13A YP705 prepared as described in Example 2 with that of the YP05-A18-12A YP701 prepared as described in Example 10.

Samples were prepared for sensory evaluation by dissolving sufficient protein powder to supply 5 g protein in 250 ml of purified drinking water. The two samples had pH values within 0.1 units of each other so no pH adjustment was done. An informal panel of eight panellists was asked to blindly taste the samples and indicate which was less astringent. The experiment was conducted a second time with a panel often members. The cumulative results are presented below.

Eleven out of eighteen panellists indicated that the YP20-E13-13A YP705 was less astringent.

Example 14

This Example illustrates a comparison of the astringency level of the YP20-H12-13A YP706 prepared as described in Example 1 with that of the YP05-A18-12A YP701 prepared as described in Example 10.

Samples were prepared for sensory evaluation by dissolving sufficient protein powder to supply 5 g protein in 250 ml of purified drinking water. The initial pH of the YP706 solution was 3.72 and it was adjusted to about 3.50 with food grade hydrochloric acid. The initial pH of the YP701 solution was 3.17 and it was adjusted to about 3.50 with food grade sodium hydroxide solution. An informal panel of seven panellists was asked to blindly taste the samples and indicate which was less astringent.

Four out of seven panellists indicated that the YP20-H12-13A YP706 was less astringent.

Example 15

This Example illustrates a comparison of the astringency level of the YP20-H14-13A YP706 prepared as described in Example 1 with that of the YP05-A18-12A YP701 prepared as described in Example 10.

Samples were prepared for sensory evaluation by dissolving sufficient protein powder to supply 5 g protein in 250 ml of purified drinking water. The initial pH of the YP701 solution was 3.12 and it was adjusted to 3.48 with food grade sodium hydroxide solution. The pH of the YP706 solution was 3.46. An informal panel of seven panellists was asked to blindly taste the samples and indicate which was less astringent.

Five out of seven panellists indicated that the YP20-H14-13A YP706 was less astringent.

Example 16

This Example illustrates a comparison of the astringency level of the LE03-D02-14A LE705 prepared as described in Example 1 with that of the LE01-J24-13A YP701 prepared as described in Example 10.

Samples were prepared for sensory evaluation by dissolving sufficient protein powder to supply 5 g protein in 250 ml of purified drinking water. The initial pH of the LE705 solution was 3.17 and it was adjusted to 3.47 with food grade sodium hydroxide solution. The initial pH of the LE701 solution was 3.81 and it was adjusted to 3.52 with food grade hydrochloric acid. An informal panel of eight panellists was asked to blindly taste the samples and indicate which was less astringent.

Six out of eight panellists indicated that the LE03-D02-14A LE705 was less astringent.

Example 17

This Example illustrates a comparison of the astringency level of the LE03-D01-14A LE706 prepared as described in Example 3 with that of the LE01-J24-13A LE701 prepared as described in Example 10.

Samples were prepared for sensory evaluation by dissolving sufficient protein powder to supply 5 g protein in 250 ml of purified drinking water. The initial pH of the LE706 solution was 3.37 and it was adjusted to about 3.5 with food grade sodium hydroxide solution. The pH of the LE701 solution was 3.84 and it was adjusted to about 3.5 with food grade hydrochloric acid solution. An informal panel of eight panellists was asked to blindly taste the samples and indicate which was less astringent.

Five out of eight panellists indicated that the LE03-D01-14A LE706 was less astringent.

Example 18

This Example contains an evaluation of the dry colour and colour in solution of the co-products of the production of reduced astringency pulse protein products, prepared according to the methods of Examples 1-3.

The colour of the dry powders was assessed using a HunterLab ColorQuest XE instrument in reflectance mode. The colour values are set forth in the following Table 14:

TABLE 14

| HunterLab scores for dry protein products | | | |
|---|---|---|---|
| Sample | L* | a* | b* |
| YP20-D23-13A YP705P | 84.78 | 1.30 | 9.87 |
| YP20-D24-13A YP705P | 88.97 | 0.21 | 6.08 |
| YP20-E02-13A YP705P | 89.06 | 0.22 | 6.37 |
| YP20-E13-13A YP705P-01 | 82.64 | 1.99 | 12.53 |
| YP20-E13-13A YP705P-02 | 83.61 | 1.80 | 11.06 |
| LE03-D02-14A LE705P | 74.27 | 1.53 | 8.32 |
| YP23-J02-13A YP706B | 81.57 | 1.32 | 10.45 |
| LE03-D01-14A LE706B | 78.19 | 1.96 | 8.35 |

As may be seen from the results in Table 14, the co-products generally were darker, redder and more yellow than the reduced astringency pulse protein products.

Solutions of the co-products from the preparation of reduced astringency pulse protein products were prepared by dissolving sufficient protein powder to supply 0.48 g of protein in 15 ml of RO water. The pH of the solutions was measured with a pH meter and the colour and clarity assessed using a HunterLab Color Quest XE instrument operated in transmission mode. The results are shown in the following Table 15.

TABLE 15

| pH and HunterLab scores for solutions of pulse protein products | | | | | |
|---|---|---|---|---|---|
| sample | pH | L* | a* | b* | haze |
| YP20-D23-13A YP705P | 5.81 | 43.87 | 5.5 | 28.43 | 97.1 |
| YP20-D24-13A YP705P | 6.13 | 40.94 | 6.82 | 30.44 | 97.3 |
| YP20-E02-13A YP705P | 4.95 | 39.68 | 6.79 | 31.08 | 99.2 |
| YP20-E13-13A YP705P-01 | 5.29 | 39.32 | 8.4 | 33.01 | 96.5 |
| YP20-E13-13A YP705P-02 | 5.03 | 32.10 | 10.7 | 34.12 | 96.4 |
| LE03-D02-14A LE705P | 6.40 | 11.69 | 11.81 | 17.59 | 97.9 |
| YP23-J02-13A YP706B | 7.39 | 41.26 | 7.88 | 31.65 | 95.7 |
| LE03-D01-14A LE706B | 7.09 | 38.09 | 7.75 | 25.18 | 97.3 |

As may be seen from the results in Table 15, the solutions of the co-products were all very high in haze. The solutions were also darker, redder and more yellow than the solutions of the reduced astringency pulse products.

Example 19

This Example contains an evaluation of the solubility in water of the co-products of the production of the reduced astringency pulse products, prepared by the methods of Examples 1 and 3. Solubility was tested based on protein solubility (termed protein method, a modified version of the procedure of Morr et al., J. Food Sci. 50:1715-1718).

Sufficient protein powder to supply 0.5 g of protein was weighed into a beaker and wetted by mixing with about 20-25 ml of reverse osmosis (RO) purified water. Additional water was then added to bring the volume to approximately 45 ml. The contents of the beaker were then slowly stirred for 60 minutes using a magnetic stirrer. The pH was determined immediately after dispersing the protein and was adjusted to the appropriate level (6, 6.5, 7, 7.5 or 8) with diluted NaOH or HCl. The pH was then measured and corrected periodically during the 60 minutes stirring. After the 60 minutes of stirring, the samples were made up to 50 ml total volume with RO water, yielding a 1% w/v protein dispersion. The protein content of the dispersions was determined by combustion analysis using a Leco Nitrogen Determinator. The samples were then centrifuged at 7,800 g for 10 minutes, which sedimented insoluble material and yielded a supernatant. The protein content of the supernatant was measured by combustion analysis.

Solubility of the product was then calculated:

Solubility (protein method) (%)=(% protein in supernatant/% protein in initial dispersion)×100      1)

Values calculated as greater than 100% were reported as 100%.

The solubility results obtained are set forth in the following Table 16:

TABLE 16

Solubility of products at different pH values based on protein method

| Batch | Product | Solubility (protein method) (%) | | | | |
|---|---|---|---|---|---|---|
| | | pH 6 | pH 6.5 | pH 7 | pH 7.5 | pH 8 |
| YP20-D23-13A | YP705P | 5.7 | 2.9 | 9.9 | 12.0 | 11.8 |
| YP20-D24-13A | YP705P | 13.0 | 9.9 | 15.2 | 11.7 | 15.3 |
| LE03-D02-14A | LE705P | 13.6 | 10.9 | 11.0 | 11.7 | 9.6 |
| YP23-J02-13A | YP706B | 16.5 | 15.5 | 20.4 | 17.7 | 19.6 |
| LE03-D01-14A | LE706B | 2.0 | 1.8 | 4.7 | 9.3 | 5.1 |

As may be seen from the results in Table 16, the co-products of the production of the reduced astringency pulse protein products were poorly soluble over the pH range of 2 to 7.

Example 20

This Example contains an evaluation of the water binding capacity of the co-products of the production of the reduced astringency pulse products, prepared by the methods of Examples 1 and 3.

Protein powder (1 g) was weighed into centrifuge tubes (50 ml) of known weight. To this powder was added approximately 20 ml of reverse osmosis purified (RO) water at the natural pH. The contents of the tubes were mixed using a vortex mixer at moderate speed for 1 minute. The samples were incubated at room temperature for 5 minutes then mixed with the vortex mixer for 30 seconds. This was followed by incubation at room temperature for another 5 minutes followed by another 30 seconds of vortex mixing. The samples were then centrifuged at 1,000 g for 15 minutes at 20° C. After centrifugation, the supernatant was carefully poured off, ensuring that all solid material remained in the tube. The centrifuge tube was then re-weighed and the weight of water saturated sample was determined.

Water binding capacity (WBC) was calculated as:

WBC (ml/g)=(mass of water saturated sample−mass of initial sample)(mass of initial sample×total solids content of sample)

The water binding capacity results obtained are set forth in the following Table 17.

TABLE 17

Water binding capacity of various products

| product | WBC (ml/g) |
|---|---|
| YP20-D23-13A YP705P | 2.60 |
| YP20-D24-13A YP705P | 2.59 |
| LE03-D02-14A LE705P | 3.90 |
| YP23-J02-13A YP706B | 2.88 |
| LE03-D01-14A LE706B | 2.74 |

As may be seen from the results of Table 17, all of the co-products of the production of the reduced astringency pulse protein products had moderate water binding capacities.

Example 21

This Example illustrates the preparation of a pulse protein isolate by conventional isoelectric precipitation.

20 kg of yellow pea protein concentrate was added to 200 L of RO water at ambient temperature and the pH adjusted to about 8.5 by the addition of sodium hydroxide solution. The sample was agitated for 30 minutes to provide an aqueous protein solution. The pH of the extraction was monitored and maintained at about 8.5 throughout the 30 minutes. The residual pea protein concentrate was removed and the resulting protein solution clarified by centrifugation and filtration to produce 240 L of filtered protein solution having a protein content of 3.52% by weight. The pH of the protein solution was adjusted to about 4.5 by the addition of HCl that had been diluted with an equal volume of water and a precipitate formed. The precipitate was collected by centrifugation then washed by re-suspending it in 2 volumes of RO water. The washed precipitate was then collected by centrifugation. A total of 30.68 kg of washed precipitate was obtained with a protein content of 22.55 wt %. This represented a yield of 81.9% of the protein in the clarified extract solution. An aliquot of 15.34 kg of the washed precipitate was combined with 15.4 kg of RO Water and then the pH of the sample adjusted to about 7 with sodium hydroxide solution. The pH adjusted sample was then spray dried to yield an isolate with a protein content of 90.22% (N×6.25) d.b. The product was designated YP12-K13-12A conventional IEP pH 7.

Example 22

This Example is a sensory evaluation of the YP20-D23-13A YP705P product prepared as described in Example 1 with the conventional pea protein isolate product prepared as described in Example 21.

Samples were prepared for sensory evaluation by dissolving sufficient protein powder to supply 5 g protein in 250 ml of purified drinking water. The initial pH of the YP12-K13-12A conventional IEP pH 7 solution was 7.08. The initial pH of the YP705P solution was 5.77 and it was adjusted to 7.08 with food grade sodium hydroxide solution. An informal panel of eight panelists was asked to blindly taste the samples and indicate which had a cleaner flavour and which sample they preferred.

Seven out of eight panellists preferred the YP20-D23-13A YP705P and seven out of eight found it to have a cleaner flavour.

Example 23

This Example is a sensory evaluation of the YP20-D24-13A YP705P product prepared as described in Example 1 with the conventional pea protein isolate product prepared as described in Example 21.

Samples were prepared for sensory evaluation by dissolving sufficient protein powder to supply 5 g protein in 250 ml of purified drinking water. The initial pH of the YP12-K13-12A conventional IEP pH 7 solution was 7.06. The initial pH of the YP705P solution was 6.18 and it was adjusted to 7.10 with food grade sodium hydroxide solution. An informal panel of nine panelists was asked to blindly taste the samples and indicate which had a cleaner flavour and which sample they preferred.

All nine panellists preferred the YP20-D24-13A YP705P and found it to have a cleaner flavour.

Example 24

This Example is a sensory evaluation of the YP23-J02-13A YP706B product prepared as described in Example 3 with the conventional pea protein isolate product prepared as described in Example 21.

Samples were prepared for sensory evaluation by dissolving sufficient protein powder to supply 5 g protein in 250 ml of purified drinking water. The pH of the YP12-K13-12A IEP pH 7 solution was 7.09. The pH of the solution of YP23-J02-13A YP706B was adjusted to 7.04 with food grade hydrochloric acid. An informal panel of eight panellists was asked to blindly taste the samples and indicate which had a cleaner flavour and which sample they preferred. The experiment was conducted a second time with a panel having 7 members. The cumulative results are presented below.

Eleven out of fifteen panellists found the YP23-J02-13A YP706B to have the cleaner flavour. Ten out of fifteen panellists preferred the YP23-J02-13A YP706B.

Example 25

This Example illustrates the molecular weight profile of the pulse protein products prepared as described in Examples 1-3 as well as the molecular weight profile of some commercial yellow pea protein products (Propulse (Nutri-Pea, Portage 1a Prairie, MB), Nutralys S85F (Roquette America, Inc. Keokuk, Iowa) and Pisane C9 (Cosucra Groupe Warcoing S.A., Belgium). These protein products were chosen as they are among the most highly purified pea protein ingredients currently commercially available.

Molecular weight profiles were determined by size exclusion chromatography using a Varian ProStar HPLC system equipped with a 300×7.8 mm Phenomenex BioSep S-2000 series column. The column contained hydrophilic bonded silica rigid support media, 5 micron diameter, with 145 Angstrom pore size.

Before the pulse protein samples were analyzed, a standard curve was prepared using a Biorad protein standard (Biorad product #151-1901) containing proteins with known molecular weights between 17,000 Daltons (myoglobulin) and 670,000 Daltons (thyroglobulin) with Vitamin B12 added as a low molecular weight marker at 1,350 Daltons. A 0.9% w/v solution of the protein standard was prepared in water, filtered with a 0.45 μm pore size filter disc then a 50 μL aliquot run on the column using a mobile phase of 0.05M phosphate/0.15M NaCl, pH 6 containing 0.02% sodium azide. The mobile phase flow rate was 1 ml/min and components were detected based on absorbance at 280 nm. Based on the retention times of these molecules of known molecular weight, a regression formula was developed relating the natural log of the molecular weight to the retention time in minutes.

Retention time (min)=−0.955×ln (molecular weight)+ 18.502 ($r^2$=0.98)

For the analysis of the pulse protein samples, 0.05M NaCl, pH 3.5 containing 0.02% sodium azide was used as the mobile phase and also to dissolve dry samples. Protein samples were mixed with mobile phase solution to a concentration of 1% w/v, placed on a shaker for at least 1 hour then filtered using 0.45 μm pore size filter discs. Sample injection size was 50 μL. The mobile phase flow rate was 1 mL/minute and components were detected based on absorbance at 280 nm.

The above regression formula relating molecular weight and retention time was used to calculate retention times that corresponded to molecular weights of 100,000 Da, 15,000 Da, 5,000 Da and 1,000 Da. The HPLC ProStar system was used to calculate the peak areas lying within these retention time ranges and the percentage of protein ((range peak area/total protein peak area)×100) falling in a given molecular weight range was calculated. Note that the data was not corrected by protein response factor.

The molecular weight profiles of the products prepared as described in Examples 1-3 and the commercial products are shown in Table 18.

TABLE 18

Molecular weight profile of pulse protein products

| product | % >100,000 Da | % 15,000-100,000 Da | % 5,000-15,000 Da | % 1,000-5,000 Da |
| --- | --- | --- | --- | --- |
| YP20-D23-13A YP705 | 31 | 33 | 31 | 5 |
| YP20-D24-13A YP705 | 30 | 36 | 29 | 5 |
| YP20-E02-13A YP705 | 31 | 37 | 28 | 4 |
| YP20-E13-13A YP705 | 66 | 16 | 14 | 4 |
| LE03-D02-14A LE705 | 37 | 38 | 16 | 9 |
| YP23-H12-13A YP706 | 21 | 30 | 42 | 7 |
| YP23-H14-13A YP706 | 28 | 29 | 36 | 7 |
| YP23-J02-13A YP706 | 16 | 28 | 48 | 8 |
| LE03-D01-14A LE706 | 39 | 34 | 18 | 9 |
| YP20-D23-13A YP705P | 22 | 29 | 34 | 15 |
| YP20-D24-13A YP705P | 21 | 30 | 33 | 17 |
| YP20-E02-13A YP705P | 24 | 32 | 30 | 15 |
| YP20-E13-13A YP705P-01 | 27 | 26 | 19 | 29 |
| YP20-E13-13A YP705P-02 | 38 | 22 | 17 | 24 |
| LE03-D02-14A LE705P | 35 | 37 | 22 | 6 |
| YP23-J02-13A YP706B | 38 | 28 | 14 | 20 |
| LE03-D01-14A LE706B | 75 | 16 | 3 | 5 |
| Nutralys S85F | 7 | 29 | 9 | 56 |
| Pisane C9 | 5 | 31 | 29 | 36 |
| Propulse | 13 | 25 | 18 | 45 |

As may be seen from the results presented in Table 18, the molecular weight profiles of the products prepared according to Examples 1-3 were different from the molecular weight profiles of the commercial yellow pea protein products.

Example 26

This Example contains an evaluation of the phytic acid content of the pulse protein products produced as described in Examples 1 to 3. Phytic acid content was determined using the method of Latta and Eskin (J. Agric. Food Chem., 28: 1313-1315).

The results obtained are set forth in the following Table 19.

TABLE 19

Phytic acid content of protein products

| product | % phytic acid d.b. |
|---|---|
| YP20-D23-13A YP705 | 0.00 |
| YP20-D24-13A YP705 | 0.00 |
| YP20-E02-13A YP705 | 0.02 |
| YP20-E13-13A YP705 | 0.00 |
| LE03-D02-14A LE705 | 0.19 |
| YP23-H12-13A YP706 | 0.00 |
| YP23-H14-13A YP706 | 0.00 |
| YP23-J02-13A YP706 | 0.01 |
| LE03-D01-14A LE706 | 0.29 |
| YP20-D23-13A YP705P | 0.02 |
| YP20-D24-13A YP705P | 0.01 |
| YP20-E02-13A YP705P | 0.06 |
| YP20-E13-13A YP705P-01 | 0.00 |
| YP20-E13-13A YP705P-02 | 0.00 |
| LE03-D02-14A LE705P | 0.23 |
| YP23-J02-13A YP706B | 0.10 |
| LE03-D01-14A LE706B | 0.21 |

As may be seen from the results in Table 19, all of the products tested were low in phytic acid content.

SUMMARY OF THE DISCLOSURE

In summary of this disclosure, the present invention provides pulse protein products, preferably pulse protein isolates, which have reduced astringency when tasted in an acidic solution such as an acidic beverage. Modifications are possible within the scope of this invention.

What we claim is:

1. A method of preparing pulse protein product with reduced astringency when tasted in aqueous solution at a pH below about 5, which comprises:
   (a) extracting a pulse protein source with an aqueous calcium salt solution to cause solubilization of pulse protein from the protein source and to form an aqueous pulse protein solution,
   (b) separating the aqueous pulse protein solution from residual pulse protein source,
   (c) optionally diluting the aqueous pulse protein solution,
   (d) adjusting the pH of the aqueous pulse protein solution to a pH of about 1.5 to about 4.4 to produce an acidified pulse protein solution,
   (e) optionally clarifying the acidified pulse protein solution if it is not already clear,
   (f) alternatively from steps (b) to (e), optionally, diluting and then adjusting the pH of the combined aqueous pulse protein solution and residual pulse protein source to a pH of about 1.5 to about 4.4 and then separating the acidified pulse protein solution from residual pulse protein source, and
   (g) fractionating the proteins in the acidified pulse protein solution to separate lower molecular weight, less astringent proteins from higher molecular weight, more astringent proteins, wherein said fractionation step is effected by:
      (i) membrane processing the acidified aqueous pulse protein solution to fractionate the protein components of the acidified aqueous pulse protein solution into a higher molecular weight fraction in a first retentate and a lower molecular weight fraction in a first permeate,
      (ii) membrane processing the first permeate to retain the lower molecular weight fraction protein components in a second retentate and to permit contaminants to pass the membrane in a second permeate,
      (iii) drying the second retentate to provide a pulse protein product of reduced astringency.

2. The method of claim 1, wherein the membrane processing step (i) is effected by microfiltration using membranes having a pore size of about 0.05 to about 0.1 μm or ultrafiltration using membrane with a molecular weight cut-off of about 10,000 to about 1,000,000 daltons to concentrate the acidified aqueous pulse protein solution to a protein concentration of about 50 to about 300 g/L to provide a concentrated retentate.

3. The method of claim 2, wherein the concentrated retentate is subjected to a diafiltration step using about 1 to about 40 volumes of diafiltration solution.

4. The method of claim 1, wherein the membrane processing of the first permeate in step (ii) is effected by ultrafiltration to concentrate the first permeate to a concentration of about 10 to about 300 g/L followed by optional diafiltration, or to a partial concentration of less than about 10 g/L, using membranes having a molecular weight cut-off of about 1,000 to about 100,000 daltons.

5. The method of claim 1, wherein the first retentate from step (i) is further processed by a step selected from the group consisting of:
   (i) drying the first retentate, and
   (ii) adjusting the pH of the first retentate to a pH of about 6 to about 8, and drying the pH-adjusted retentate.

6. The method of claim 1 wherein the membrane processing step (i) is effected by microfiltration using membranes having a pore size of about 0.08 to about 0.1 μm or ultrafiltration using membrane processing of a molecular weight cut-off of about 100,000 to about 1,000,000 daltons to concentrate the acidified aqueous pulse protein solution to a protein concentrate of about 100 to about 200 g/L to provide a concentrated retentate.

7. The method of claim 2 wherein the concentrated retentate is subjected to a diafiltration step using about 2 to about 25 volumes of diafiltration solution.

8. The method of claim 4, wherein the membrane processing of a first permeate in step (ii) is effected by ultrafiltration to concentrate the first permeate to a concentration of about 100 to about 200 g/L, followed by optional diafiltration, or to a partial concentration of less than about 10 g/L, using membrane having a molecular weight cut-off of about 1,000 to about 10,000 daltons.

* * * * *